F. COLEMAN.
TIRE FORMING CORE.
APPLICATION FILED MAR. 21, 1911.
1,131,332.
Patented Mar. 9, 1915.
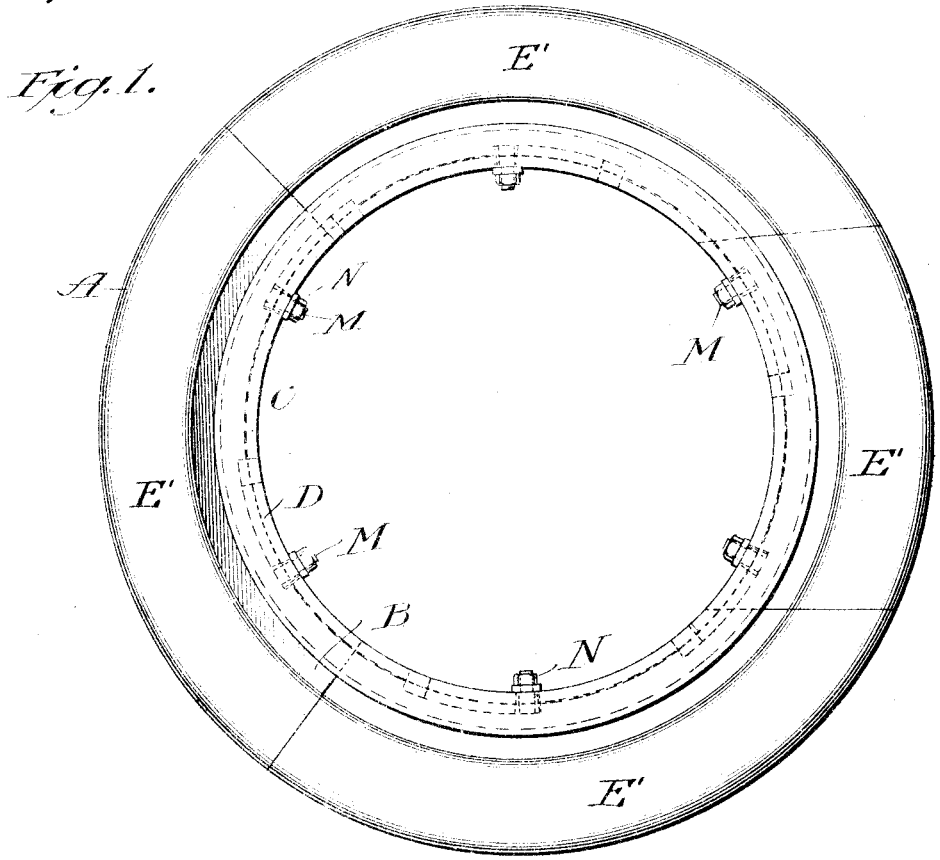
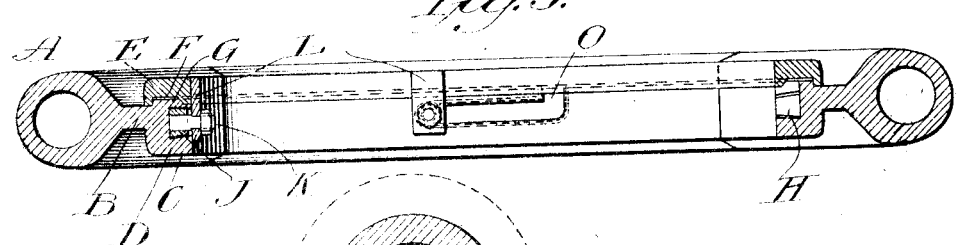
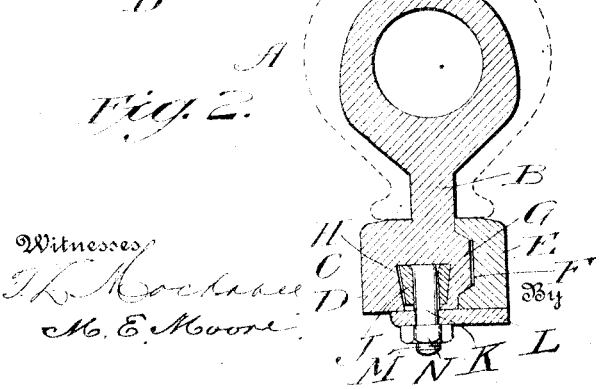

UNITED STATES PATENT OFFICE.

FORD COLEMAN, OF AKRON, OHIO.

TIRE-FORMING CORE.

1,131,332.  Specification of Letters Patent.  Patented Mar. 9, 1915.

Application filed March 21, 1911. Serial No. 615,988.

*To all whom it may concern:*

Be it known that I, FORD COLEMAN, a citizen of the United States, residing at Akron, in the county of Summit and State of Ohio, have invented certain new and useful Improvements in Tire-Forming Cores, of which the following is a specification.

My invention relates to improvements in tire forming cores and refers particularly to a collapsible metal core for use in forming pneumatic tires.

The object of my invention is the provision of a core which will comprise few parts insuring cheapness and durability; which will insure the proper form to the tire and which can be collapsed and readily removed from the tire thus providing a core which will insure ease and rapidity in the manufacture of the tire as well as the proper forming of the tire.

To attain the desired object my invention consists of a core shaped to form the tire and having removable sections to permit ready withdrawal after the molding or forming of the tire.

The invention also consists of a collapsible tire forming core embodying novel features of construction and combination of parts for service substantially as disclosed herein.

Figure 1 represents a side view of the complete core, constructed in accordance with and embodying my invention, the parts being in position for forming the tire. Fig. 2 represents a transverse sectional view of the core, showing in dotted lines the position the molded tire assumes upon the core, and Fig. 3 represents a transverse sectional view through the complete core.

My collapsible core is made of metal and consists of the practically cylindrical rim A shaped to correspond with the body of the tire, the restricted or reduced neck portion B, to correspond with the reduced portion of the tire and the broadened base portion C which forms the flanges upon the tire. As will be seen by inspection of Fig. 1, the core is formed of a plurality of sections, preferably four in number, which are collapsed after the tire is formed and withdrawn successively through the opening along the inner central line of the tire. The broadened portion is of substantially rectangular shape when complete and one side D is rigid and the other side consists of the removable annular locking ring or section E, formed with the angle shaped channel F, which fits snugly upon the rib G on one side of the broad portion of the core and when assembled forms with the rigid portion the complete core. The core sections are formed with the tapered recesses H inclined beyond the inlets O thereof and in which fits the wedge shaped blocks J, through which pass the bolts K, also passing through the transversely disposed plates L, which are connected to the removable section E, and upon the outer threaded ends M of the bolts are screwed the nuts N. From this construction it will be seen that a series of the removable core sections E' are used and that when the core is complete these sections form with the locking ring E the complete core as seen most clearly in Fig. 3, and the parts are assembled by placing said ring upon the core sections with the blocks within the recesses and tightening the same by rotation and after the tire has been formed or molded, the securing plate L and blocks J are moved or slid upwardly in the inclined recesses H until the bolts and blocks are opposite the outlets O of the recesses when the plates, blocks and ring are removed which leaves ample space for the withdrawal of the complete core by removing one section at a time.

It will thus be seen that I provide a collapsible core which can be quickly set up and which will insure the forming or molding of a perfect tire and that after the forming of the tire it is but the work of an instant to collapse the core and remove it, thus producing a core of the character and for the purpose intended which is thoroughly efficient and practical in every particular.

I claim:

1. A tire forming core composed of a plurality of sections, the inner face of each of which is provided with a longitudinal recess terminating in a lateral opening, and a locking section movable upon the core and provided with devices engaging said recesses in the sections.

2. A tire forming core composed of a plurality of sections, the inner face of each of which is provided with a longitudinal recess terminating in a lateral opening, and a locking section provided with a plurality of plates or arms each of which is provided with means engaging the corresponding recess of the adjacent section.

3. A tire forming core composed of a plurality of sections the inner face of each of which is provided with a longitudinal recess terminating in a lateral opening, the extremities of said sections being provided with an inlet slot and a projecting lug adapted to engage the corresponding slot and lug of the adjacent section when the sections are assembled to form an interlocking connection.

4. A tire forming core composed of a plurality of sections the inner face of each of which is provided with a longitudinal recess terminating in a lateral opening, the extremities of said sections being provided with an inlet slot and a projecting lug adapted to engage the corresponding slot and lug of the adjacent section when the sections are assembled to form an interlocking connection, and means engaging said recesses in the sections for retaining the sections in place when the core is assembled.

5. A tire forming core composed of a plurality of sections the inner face of each of which is provided with a longitudinal recess terminating in a lateral opening, the extremities of said sections being provided with an inlet slot and a projecting lug adapted to engage the corresponding slot and lug of the adjacent section when the sections are assembled to form an interlocking connection, and a locking section slidable upon the core and provided with devices engaging the recesses of the sections for retaining the sections in place when the core is assembled.

6. A tire forming core composed of a plurality of arcuate sections, each having a longitudinal recess terminating in a lateral opening, an annular locking member provided with a plurality of arms and movable upon said sections, and adjusting and securing bolts passing through said arms.

7. A tire forming core composed of a plurality of arcuate sections, each having a longitudinal recess terminating in a lateral opening, an annular locking member provided with a plurality of arms and movable upon said sections, devices carried by said arms engaging in said recesses, and bolts passing through said arms and devices carried thereby for securing the parts in position upon the sections.

8. A core for tires made up of a plurality of sections, a continuous locking ring, and interengaging members carried by said locking ring and said sections, said interengaging members being of such shape that bodily rotation of said ring with relation to said members will tighten the ring on the sections and lock all of said sections together.

In testimony whereof I affix my signature in presence of two witnesses.

FORD COLEMAN.

Witnesses:
HUGH NESBITT,
JOHN DORMAN.